United States Patent [19]

Stingelin et al.

[11] Patent Number: 4,652,645
[45] Date of Patent: Mar. 24, 1987

[54] CATIONIC COMPOUNDS

[75] Inventors: Willy Stingelin, Reinach, Switzerland; Jean-Marie Adam, Rosenau, France

[73] Assignee: Ciba-Geigy Corporation, Ardsley, N.Y.

[21] Appl. No.: 669,411

[22] Filed: Nov. 8, 1984

[30] Foreign Application Priority Data

Nov. 16, 1983 [CH] Switzerland ............... 6155/83

[51] Int. Cl.⁴ .................. C07D 403/12; C07D 417/12
[52] U.S. Cl. ................................. 544/198; 544/212; 544/113; 544/209
[58] Field of Search ............... 544/212, 209, 198, 219, 544/113

[56] References Cited

U.S. PATENT DOCUMENTS 4,161,592  7/1979  Evans et al. ............... 544/212
4,380,627  4/1983  Stingelin et al. ............ 544/212
4,462,805  7/1984  Stingelin et al. ............ 8/436

Primary Examiner—John M. Ford
Attorney, Agent, or Firm—Edward McC. Roberts; Kevin T. Mansfield; Irving M. Fishman

[57] ABSTRACT

There are described novel cationic compounds of the formula

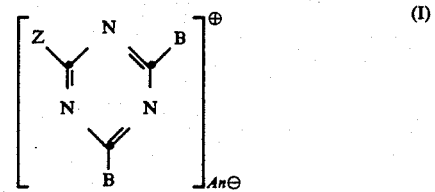

wherein the symbols B and Z have the meanings defined in claim 1, and also processes for producing them and their use for dyeing and printing textile materials, such as polyacrylonitrile materials, leather and particularly paper, there being obtained greenish to reddish yellow dyeings which are distinguished by good general fastness properties.

14 Claims, No Drawings

CATIONIC COMPOUNDS

The invention relates to novel cationic compounds, to processes for producing them, and to their use as dyes for dyeing and printing textile materials, leather and in particular paper.

The novel cationic compounds correspond to the formula I

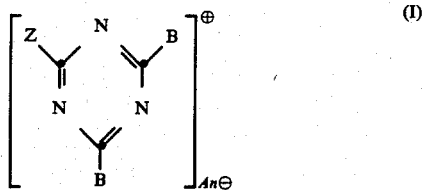

wherein
Z is a radical of the formula

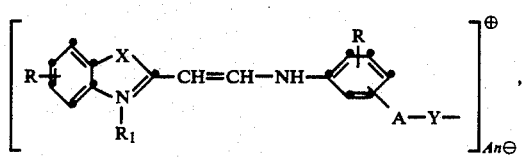

one of the two B symbols either has the meaning of Z or is a radical of the formula

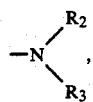

and the other of the two B symbols is an identical or different radical of the formula

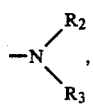

R independently of one another are each hydrogen, unsubstituted or substituted $C_1$-$C_4$-alkyl, unsubstituted or substituted $C_1$-$C_4$-alkoxy, the $NO_2$ group, unsubstituted or substituted acylamino, halogen or the CN group,
X is a sulfur atom or the group

in which both $R_1$ radicals can also be linked together to form a carbocyclic 5- or 6-membered ring,
A is the direct bond, —NH-alkylene-($C_1$-$C_4$), —O-alkylene-($C_1$-$C_4$), alkylene-($C_1$-$C_4$), phenylene, —O-phenylene or —NH-phenylene,
Y is —NH—, —$NR_1$—, —O— or —S—,
$R_1$ independently of one another are each unsubstituted or substituted $C_1$-$C_4$-alkyl or $C_3$-$C_4$-alkenyl,
$R_2$ is an unsubstituted or substituted aryl group or an unsubstituted or substituted heterocycle,
$R_3$ is hydrogen, an unsubstituted or substituted $C_1$-$C_6$-alkyl group or an unsubstituted or substituted $C_2$-$C_6$-alkenyl group, and
An is an anion.

As an unsubstituted or substituted $C_1$-$C_4$-alkyl group, R is a straight-chain or branched-chain alkyl group, for example a methyl, ethyl, n- or iso-propyl group, or an n-, sec- or tert-butyl group. These groups can be substituted for example by a $C_1$-$C_4$-alkoxy group, such as the methoxy, ethoxy or n- and iso-propoxy group or the n- and iso-butoxy group, by CN, by halogen, such as fluorine, chlorine or bromine, by phenyl (for its part unsubstituted or further substituted by for example halogen, alkyl and/or alkoxy), by $CONH_2$, or by a carboxylic acid amide group mono- or disubstituted on the N atom (for example by $C_1$-$C_4$-alkyl).

When R is an unsubstituted or substituted $C_1$-$C_4$-alkoxy group, it is a straight-chain or branched-chain alkoxy group, for example the methoxy, ethoxy or n- and iso-propoxy group or the n- and iso-butoxy group, which groups can be further substituted, for example by phenyl.

If R is an acylamino group, it is for example the benzoylamino or acetylamino group. The acylamino group can be substituted, for example by halogen, such as fluorine, chlorine or bromine, or by an $NH_2$ group, or by an amino group mono- or disubstituted on the N atom by for example $C_1$-$C_4$-alkyl.

When R is a halogen atom, it is in particular the fluorine, chlorine or bromine atom.

It is however also possible for the substituent R to occur several times in one and the same benzene ring.

In the preferred cationic compounds of the formula I, R is hydrogen or an unsubstituted, straight-chain $C_1$-$C_4$-alkyl group, in particular the methyl group, or an unsubstituted, straight-chain alkoxy group, especially the methoxy group, or halogen, particularly chlorine.

If $R_1$ is an unsubstituted or substituted $C_1$-$C_4$-alkyl group, it is a straight-chain or branched-chain alkyl group, for example the methyl, ethyl or n- and iso-propyl group or the n- and isobutyl group. These groups can be substituted for example by $C_1$-$C_4$-alkoxy (straight-chain and branched-chain, such as methoxy, ethoxy or n- and iso-propoxy); by CN or halogen (fluorine, chlorine or bromine); by phenyl which is unsubstituted or substituted by $C_1$-$C_4$-alkyl or by halogen; or by the $CONH_2$ group. When $R_1$ is an alkenyl group, it is for example the allyl group.

In the preferred cationic compounds of the formula I, $R_1$ is an unsubstituted, straight-chain $C_1$-$C_4$-alkyl group, especially the $CH_3$ group.

When X is the

grouping, where the two $R_1$ radicals can be linked together to form a carbocyclic 5- or 6-membered ring, it is in particular the unsubstituted cyclopentane or cyclohexane ring.

In the preferred cationic compounds of the formula I, X is the

grouping, wherein the $R_1$ radicals are each a straight-chain, unsubstituted $C_1$–$C_4$-alkyl group; X is in particular the

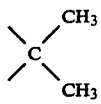

grouping.

If A is an -alkylene-($C_1$–$C_4$), —NH-alkylene-($C_1$–$C_4$) or —O-alkylene-($C_1$–$C_4$) bridge, the "alkylene" bridge is for example the methylene, ethylene or n- and iso-propylene bridge or the n- and iso-butylene bridge.

In the preferred cationic compounds of the formula I, A is bound in the m- or p-position with respect to the —CH=CH—NH bridge, and is either the direct bond or —O-phenylene or —NH-phenylene.

As an —$NR_1$ group, Y is an —N-alkyl-($C_1$–$C_4$) group, such as the —$N.CH_3$, —$N.C_2H_5$ or —$N.C_3H_7$ group, where the alkyl radical can be substituted as defined, particularly by CN or halogen.

In the preferred cationic compounds of the formula I, Y is the —NH or —$NR_1$ group, especially the —$N.CH_3$ group.

As aryl, $R_2$ is for example phenyl or naphthyl, and as a heterocycle it is a 5- or 6-membered heterocycle, for example: thiazole, imidazole, pyrazole, triazole, piperazine, pyridine, piperidine and morpholine.

Both the aryl group $R_2$ and the heterocycle $R_2$ can be substituted, for example by $C_1$–$C_4$-alkoxy (straight-chain and branched-chain, such as methoxy, ethoxy or n- and iso-propoxy), by $C_1$–$C_4$-alkyl (straight-chain or branched-chain, such as methyl, ethyl or n- and iso-propyl), by OH, halogen (fluorine, chlorine or bromine), $NO_2$, CN, NH, $C_1$–$C_4$-alkyl, N(alkyl)$_2$, [⊕N(alkyl)$_3$]An ⊖ and $NH_2$.

When $R_3$ is $C_1$–$C_6$-alkyl, this alkyl group can be interrupted once or several times by —O—, —S— and/or —NH—; and this alkyl group can be straight-chain or branched-chain. It is for example the methyl, ethyl or n- and iso-propyl group, the n-, sec- and tert-butyl group, the n- and iso-pentyl group or the n-hexyl group.

If $R_3$ is $C_2$–$C_6$-alkenyl, it is for example the radicals —$CH_2$—CH=$CH_2$ and —$CH_2$—CH=CH—$CH_3$.

Both the $C_2$–$C_6$-alkyl group $R_3$ and the $C_1$–$C_6$-alkenyl group $R_3$ can be substituted, substituents being for example: OH, halogen (fluorine, chlorine or bromine), $NO_2$, CN, NH-alkyl($C_1$–$C_4$), N(alkyl-$C_1$–$C_4$)$_2$ and [⊕N(alkyl-$C_1$–$C_4$)$_3$]An ⊖.

When the possible substituent in $R_2$ and/or $R_3$ is a [⊕N(alkyl-$C_1$–$C_4$)$_3$]An ⊖ group, it is for example one of the following cation substituents.

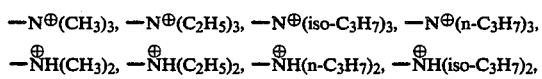

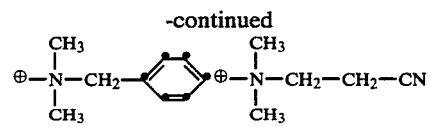

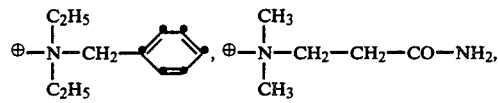

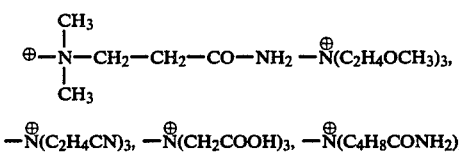

—$\overset{\oplus}{N}(C_2H_4CN)_3$, —$\overset{\oplus}{N}(CH_2COOH)_3$, —$\overset{\oplus}{N}(C_4H_8CONH_2)_3$, In preferred cationic compounds of the formula I, one of the two B symbols is the group of the formula

wherein $R_2$ is phenyl and $R_3$ is $C_1$–$C_4$-alkyl, especially $CH_3$, and the other B symbol has the meaning of Z.

By way of explanation, it is emphasised that when one of the two B symols has the meaning of Z, both symmetrical and asymmetrical compounds can be concerned. When the two B symbols are each an amine group of the formula

these two amine groups can in this case too be identical or different from one another. Furthermore, the substituents $R_2$ and $R_3$ can, as stated, be substituted by cationic groups, so that there result compounds of the formula I which contain several cationic groups. The style of formula I merely expresses therefore that cationic compounds are involved, independently of the number of cationic groups.

Anions An are both inorganic and organic anions: they are for example the halide ion, such as the chloride, bromide or iodide ion, also the tetrafluoroborate, sulfate, methylsulfate, aminosulfate, perchlorate, carbonate, bicarbonate, phosphate, phosphomolybdic, phosphotungstic, phosphotungstomolybdic, benzenesulfonate, napththalenesulfonate, 4-chlorobenzenesulfonate, oxalate, maleate, formate, acetate, propionate, lactate, succinate, chloroacetate, tartrate, methanesulfonate or benzoate ions, or complex anions, such as those of zinc chloride double salts.

Preferred anions An are formate, acetate, lactate, chloride, sulfate and phosphate ions.

The novel cationic compounds of the formula I can be produced by known methods.

For example, the compounds of the formula I wherein one B has the meaning of Z are obtained by condensing 1 mol of a diamine of the formula II

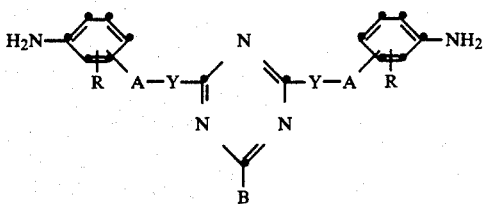

with 2 mols of an aldehyde compound of the formula III

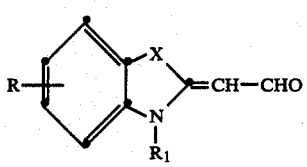

in the presence of an acid HAn.

Those compounds of the formula I wherein both B symbols have the meaning of the formula

are obtained for example by reacting a compound of the formula IV

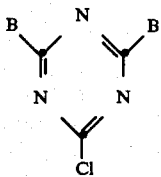

with a compound of the formula V

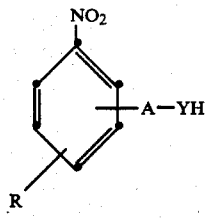

to give a compound of the formulal VI

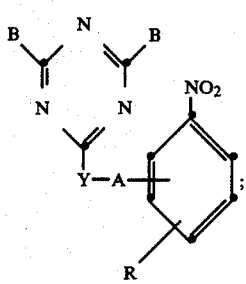

subsequently reducing the $NO_2$ group to the $NH_2$ group, and subjecting the resulting product to a condensation reaction with 1 mol of an aldehyde compound of the formula III in the presence of an acid HAn, the symbols R, A, Y, B, $R_1$ and X being identical or different from one another and having the meanings defined under the formula I.

The diamines of the formula II and the aldehyde compounds of the formula III are known and can be produced by known methods. The diamines of the formula II are obtained for example by reacting in sym. trichlorotriazine the chlorine atoms stepwise with compounds of the formula

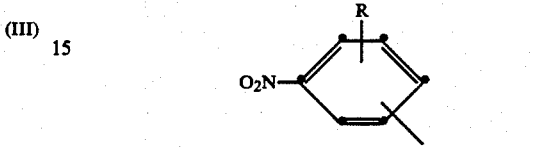

and with B—H, and subsequently reducing in the condensation product the $NO_2$ group to the $NH_2$ group.

Aldehyde compounds of the formula III are for example: 13,3-trimethyl-2-methylene-indoline-ω-aldehyde, 1,3,3-trimethyl-5-chloro-2-methylene-indoline-ω-aldehyde, 1,3,3-trimethyl-5-phenyl-2-methylene-indoline-ω-aldehyde and 1,3,3-trimethyl-5-cyano-2-methylene-indoline-ω-aldehyde.

The condensation reaction, for example of the diamine of the formula II with the aldehyde compound of the formula III, is performed in a known manner, for example in an aqueous medium, at a temperature of about 0° to 100° C., in the presence of an acid HAn. This acid AHn is an organic acid, such as acetic acid or arylsulfonic acid, particularly benzenesulfonic acid; or an inorganic acid, such as hydrochloric acid, sulfuric acid or phosphoric acid.

After the condensation reaction, the novel cationic compounds are optionally separated from the reaction medium and dried. If desired or necessary, it is possible to exchange in the cationic compounds of the formula I in a known manner the anion An for another anion.

The novel compounds can however also be converted directly, after concentration of the reaction medium by evaporation, into a liquid commercial form. The novel cationic compounds of the formula I are used as dyes for dyeing and, with the addition of binders and optionally solvents, for printing materials dyeable with cationic dyes, especially textile materials which consist, for example, advantageously of homo- or copolymers of acrylonitrile, or synthetic polyamides or polyesters modified by acid groups. Dyeing is preferably performed in an aqueous, neutral or acid medium by the exhaust process, optionally under pressure, or by the continuous process. The textile material can be in the most varied forms: for example in the form of fibres, filaments, fabrics, knitted goods, piece goods and finished articles, such as shirts and pullovers.

It is possible by application of the dyes of the invention to produce level, greenish to reddish yellow dyeings or printings which are distinguished by very good general fastness properties.

Furthermore, the novel cationic dyes can be used for dyeing and printing natural and regenerated cellulose materials, particularly cotton and viscose, there being likewise obtained greenish to reddish yellow, deeply coloured dyeings. The novel dyes have on these textile materials good substantivity and a high degree of absorption, and the dyeings obtained have very good fastness properties, especially very good fastness to wet processing.

A further application of the novel cationic dyes of the formula I is for the dyeing of paper of all types, in particular bleached, unsized and sized, lignin-free paper. These compounds are more especially suitable for dyeing unsized paper (tissues) by virtue of their very high affinity for this substrate.

The novel compounds exhaust very well onto these substrates, the waste liquors being left colourless, a factor which is of great ecological advantage, especially in view of the present-day effluent laws. The dyeings obtained are fast to wet processing, that is to say, they exhibit no tendency to bleed when dyed paper in the wet state is brought into contact with moist white paper. This property is particularly desirable with regard to so-called "tissues", in the case of which it is foreseeable that the dyed paper in the wet condition (for example soaked with water, alcohol, tenside solution, and so forth) will come into contact with other surfaces, such as textiles, paper, and the like, which have to be protected against soiling.

The good affinity for paper and the high rate of exhaustion of the novel dyes according to the present invention is of great advantage for the continuous dyeing of paper, and renders possible a much wider application of this known economical process.

The novel dyes can be applied by the most varied processes to the paper material, for example in pulp dyeing, in the sizing press, and from aqueous inks by the use of the ink-jet method.

Finally, the novel dyes of the invention can be used also for dyeing leather (for example by spraying, brushing and dipping), and for the preparation of inks.

The following Examples further illustrate the invention without the scope thereof being limited by them. The term 'parts' denotes parts by weight, and % values are percent by weight.

EXAMPLE 1

Eight parts of 2,4-di-(4'-aminophenylamino)-6-N-methyl-phenylaminotriazine and 8 parts of 1,3,3-trimethyl-2-methyleneindoline-ω-aldehyde are stirred up in 45 parts of water and 30 parts of methanol. The mixture is heated for about 20 to 30 minutes to 60°–65° C., and simultaneously there commences the dropwise addition of 43.8 parts of 4% aqueous hydrochloric acid, the dropwise addition of the hydrochloric acid being finished after 2 hours. Stirring is maintained for a further 1 hour at the same temperature; and the methanol is subsequently removed from the reaction mixture by distillation in vacuo. The dye which has precipitated is stirred up in 150 parts of cold water; it is then filtered off, washed with a small amount of water and dried at 70° C. The yield is 16.0 parts of a yellow dye powder of the following structure

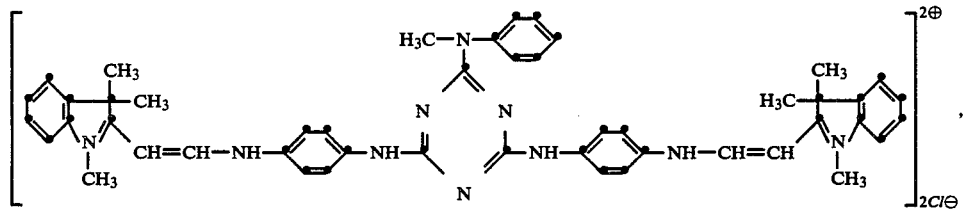

When the procedure is carried out in a manner analogous to that described above, but with the use of the components shown in columns II and III of the following Table 1, there are obtained dyes which dye paper in the shades listed in column IV.

TABLE 1

| I Example | II R | III M$_1$ | M$_2$ | B | IV Shade on paper |
|---|---|---|---|---|---|
| 2 | H | —NH—⟨⟩—NH$_2$ | —NH—⟨⟩—NH$_2$ | —N(H)(⟨⟩—CH$_3$) | yellow |
| 3 | Cl | —NH—⟨⟩—NH$_2$ | —NH—⟨⟩—NH$_2$ | —N(CH$_3$)(⟨⟩) | golden-yellow |
| 4 | H | —NH—⟨⟩—NH$_2$ | —NH—⟨⟩—NH$_2$ | —N(CH$_3$)(⟨⟩) | greenish-yellow |

TABLE 1-continued

| Example | R | M₁ | M₂ | B | Shade on paper |
|---|---|---|---|---|---|
| 5 | H | −NH−⟨C₆H₄⟩−NH₂ | −NH−⟨C₆H₄⟩−NH₂ | −N(CH₃)−⟨pyrrole⟩ | yellow |
| 6 | H | −NH−⟨C₆H₄⟩−NH₂ | −NH−⟨C₆H₄⟩−NH₂ | −N(C₂H₅)−⟨pyrrole⟩ | yellow |
| 7 | H | −NH−⟨C₆H₄⟩−NH₂ | −NH−⟨pyrrole⟩ | −NH−⟨pyrrole⟩ | yellow |
| 8 | Cl | −NH−⟨C₆H₄⟩−NH₂ | −NH−⟨pyrrole⟩ | −NH−⟨pyrrole⟩ | yellow |
| 9 | H | −NH−⟨C₆H₄⟩−NH₂ | −NH−⟨pyrrole⟩ | −N(CH₃)−⟨pyrrole⟩ | yellow |
| 10 | H | −NH−⟨C₆H₃(OCH₃)⟩−NH₂ | −NH−⟨C₆H₃(OCH₃)⟩−NH₂ | −N(CH₃)−⟨pyrrole⟩ | golden-yellow |
| 11 | H | −NH−⟨C₆H₄⟩−NH₂ | −NH−⟨C₆H₄⟩−NH₂ | −NH−⟨thiazole⟩ | yellow |

EXAMPLE 12

9.9 parts of 2,4-di-(2'-methoxy-4'-aminophenylamino)-6-(4'-chloro-3'-aminophenylamino)-triazine and 8.0 parts of 1,3,3-trimethyl-2-methyleneindoline-ω-aldehyde are stirred up in 50 parts of methanol and 2.6 parts of 85% formic acid for 10 hours at 25°–30° C.; the dye is subsequently isolated by removal of the methanol by distillation in vacuo. There are thus obtained 9.5 parts of a crystalline orange dye powder of the following structure:

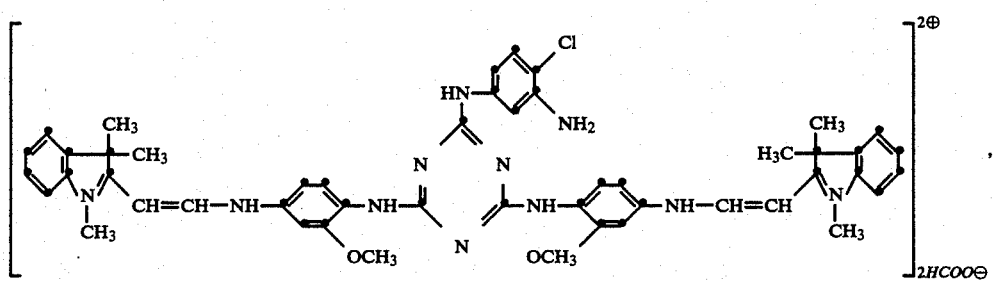

If the procedure is carried out in a manner analogous to that described above but with the use of the components shown in columns II and III of the following Table 2, there are obtained dyes which dye paper in the shades listed in column IV.

TABLE 2

| I Example | R | M₁ | M₂ | B | IV Shade on paper |
|---|---|---|---|---|---|
| 13 | H |  |  |  | yellow |
| 14 | H |  |  |  | greenish-yellow |
| 15 | Cl |  |  |  | greenish-yellow |
| 16 | H |  |  |  | yellow |
| 17 | H |  |  |  | yellow |
| 18 | H |  |  |  | greenish-yellow |
| 19 | H |  |  |  | yellow |
| 20 | H |  |  |  | greenish-yellow |
| 21 | H |  |  | —N(H)—C₆H₃—Cl | greenish-yellow |

EXAMPLE 22

9.4 parts of 2,4-di-(4'-aminophenylamino)-6-(4'-N-chlorotrimethylaminophenylamino)-triazine, obtained by reaction of 2,4-di-(4'-nitro-phenylamino)-6-chlorotriazine with 4-amino-N,N-dimethylaniline, subsequent quaternisation with dimethyl sulfate and catalytic hydrogenisation of the nitro groups, and 8.0 parts of 1,3,3-trimethyl-2-methyleneindoline-ω-aldehyde are stirred up in 60 parts of methanol and 30 parts of water. The mixture is heated to 60°–65° C., and simultaneously there commences the dropwise addition of 43.8 parts of 4% aqueous hydrochloric acid, the dropwise addition of the hydrochloric acid being finished after 2 hours. Stirring is maintained for a further 1 hour at the same temperature; and the methanol is subsequently removed from the reaction mixture by distillation in vacuo. The dye which remains is dissolved in 180 parts of water at 50° C. and is then precipitated by the addition of 20 parts of sodium chloride. There are thus obtained, after filtration and drying, 18 parts of a yellow dye powder of the following structure.

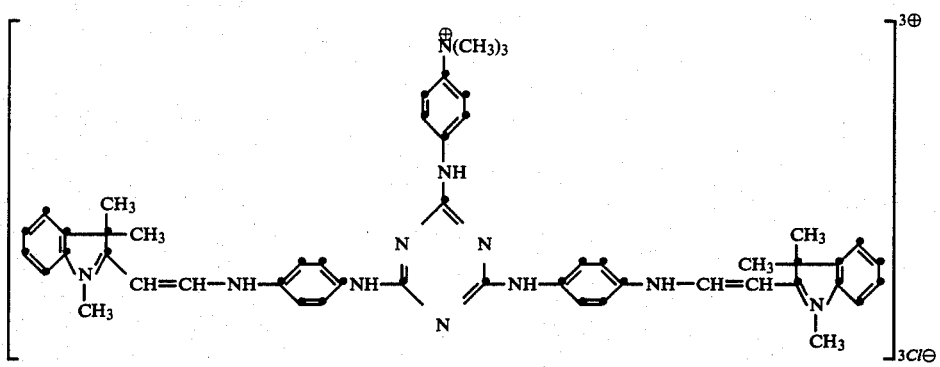

EXAMPLE 23

50 parts of chemically bleached beech sulfite are mixed with 50 parts of bleached RKN 15 (freeness value 22° SR) and 2 parts of the dye according to Example 1 in water (pH 6, water hardness 10° dH, temperature 20° C., ratio of goods to liquor 1:40). After 15 minutes' stirring, paper sheets are produced on a Frank sheetformer.

The paper has been dyed in a very intense yellow shade, and the waste liquor is colourless. The degree of exhaustion is practically 100%. The fastness to light and fastness to wet processing are excellent.

EXAMPLE 24

A paper web is produced from bleached beech sulfite (22° SR) on a continuously operating laboratory paper-making machine. Ten seconds before the breastbox, an aqueous solution of the dye according to Example 1 is fed continuously, with intense turbulence, into the fibre suspension (0.5% dyeing, ratio of goods to liquor 1:400, water hardness 10° dH, pH 6, temperature 20° C.).

A deeply coloured yellow shade of medium intensity has been imparted to the paper web, the waste liquor being left colourless.

EXAMPLE 25

10 parts of cotton fabric (bleached mercerised cotton) are dyed, in a laboratory beam dyeing machine, in 200 parts of a liquor (water hardness 10° dH, pH 4, 3 circulations of the dye liquor per minute) containing 0.05 part of the dye according to Example 1. The temperature is raised in 60 minutes from 20° to 100° C., and is then held constant for 15 minutes. The dye liquor is fully exhausted. There is imparted to the cotton fabric a deeply coloured yellow dyeing which is distinguished by good fastness to light and by very good fastness to wet processing.

When the same procedure is used to dye a textile fabric made from regenerated cellulose (viscose), there is obtained on this material, with the dye of Example 1, a deeply coloured yellow dyeing which has good fastness to light and very good fastness to wet processing.

What is claimed is:

1. A cationic compound of the formula

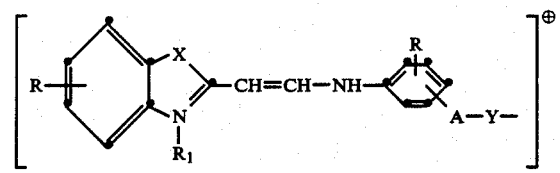

wherein
Z is a radical of the formula

one of the two B symbols either has the meaning of Z or is a radical of the formula

and the other of the two B symbols is an identical or different radical of the formula

R independently of one another are each hydrogen, nitro, cyano, halogen, $C_1$-$C_4$alkyl, or $C_1C_4$alkyl substituted by $C_1$-$C_4$alkoxy, cyano, halogen, $CONH_2$, $CONH$—$C_1$-$C_4$alkyl, $CON(C_1$-$C_4$-alkyl$)_2$ or phenyl which is unsubstituted or substituted by halogen, alkyl and/or alkoxy, or are alkanoylamino, benzoylamino, $C_1$-$C_4$ alkoxy or $C_1$-$C_4$ alkoxy substituted by phenyl, $R_1$ independently of one another are each $C_3$-$C_4$alkenyl, $C_1$-$C_4$alkyl, or $C_1$-$C_4$alkyl substituted by $C_1$-$C_4$alkoxy, cyano, halogen, $CONH_2$ or phenyl which is unsubstituted or substituted by $C_1$-$C_4$alkyl or halogen, R₂ is phenyl, naphthyl, thiazolyl, imidazolyl, pyrazolyl, triazolyl, piperazinyl, pyridyl, piperidyl or morpholyl, each of which is unsubstituted or substituted by C₁-C₄ alkoxy, C₁-C₄ alkyl, hydroxyl, halogen, nitro, or cyano, R₃ is hydrogen, C₁-C₆alkyl or C₂-C₆alkenyl, or C₁-C₆alkyl or C₂-C₆alkenyl substituted by hydroxyl, halogen, nitro, or cyano, X is sulfur or

with R₁ being as defined above or both R₁ together with the carbon to which they are attached form a cyclohexyl or cyclopentyl ring, Y is —NH—, —NR₁—, —O— or —S—, A is the direct bond, —NH—C₁-C₄alkylene-, —O—C₁-C₄alkylene-, C₁-C₄alkylene, phenylene, —O-phenylene- or —NH-phenylene-, n is 1 or 2 and An is an anion.

2. A cationic compound of claim 1, wherein one of the two B symbols has the meaning of Z.

3. A cationic compound of claim 1, wherein R is hydrogen, CH₃, OCH₃ or chlorine.

4. A cationic compound of claim 1, wherein R₁ is unsubstituted, straight-chain C₁-C₄-alkyl.

5. A cationic compound of claim 4, wherein R₁ is the CH₃ group.

6. A cationic compound of claim 1, wherein X is the

group.

7. A cationic compound of claim 6, wherein X is the

group.

8. A cationic compound of claim 1, wherein A is bound in the m- or p-position with respect to the —CH═CH—NH bridge.

9. A cationic compound of claim 1, wherein A is the direct bond, —O-phenylene or —NH-phenylene.

10. A cationic compound of claim 1, wherein Y is the —NH-group or —NR₁-group.

11. A cationic compound of claim 10, wherein Y is —NCH₃—.

12. A cationic compound of claim 1, wherein R₂ is phenyl.

13. A cationic compound of claim 1, wherein R₃ is C₁-C₄-alkyl.

14. A cationic compound of claim 13, wherein R₃ is CH₃.

* * * * *